Oct. 28, 1958  H. P. FITZGERALD  2,857,835
SOIL FRACTURING POINT WING SHANK AND HOLDER
Filed May 4, 1955
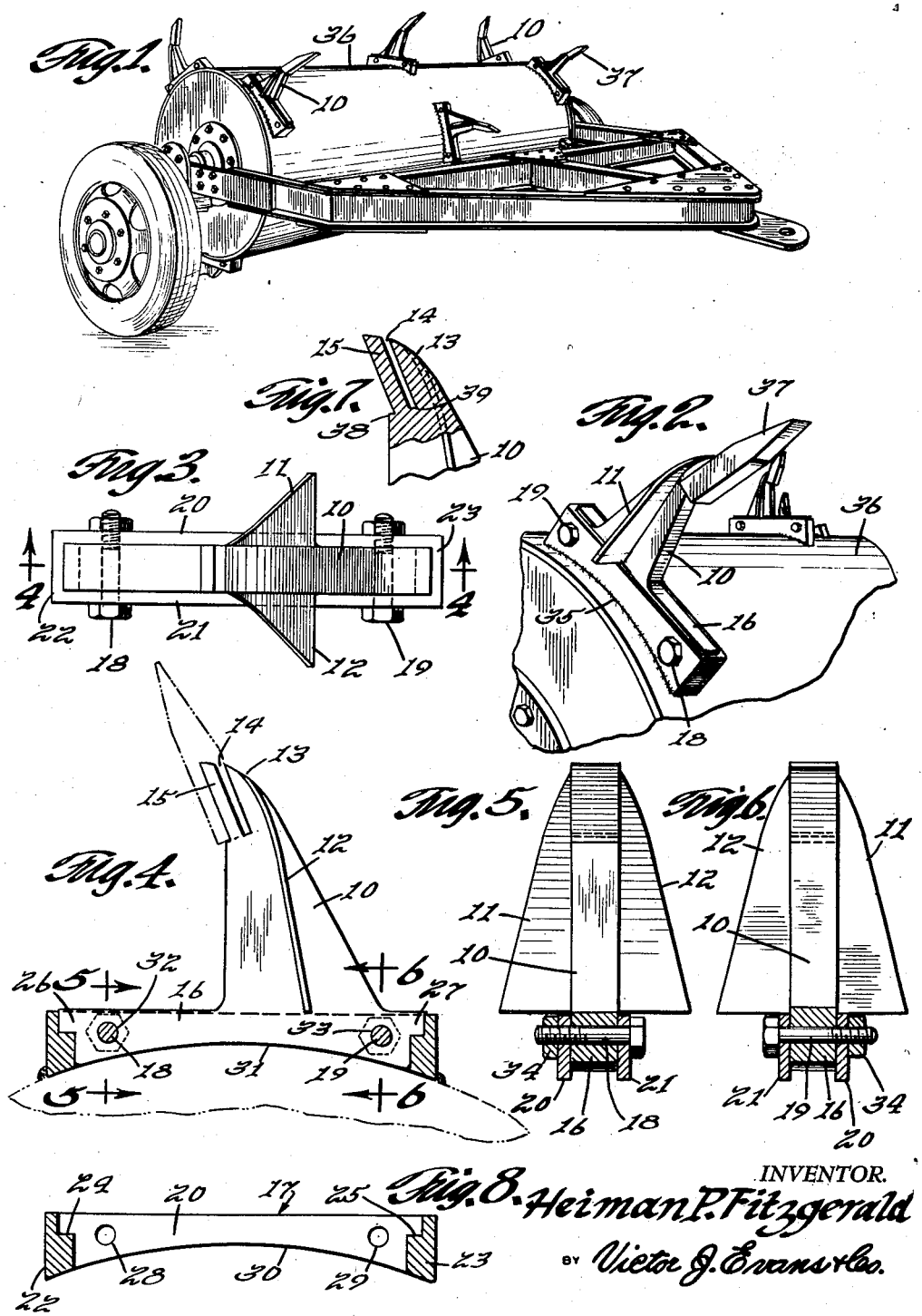
INVENTOR.
Heiman P. Fitzgerald
BY Victor J. Evans & Co.
ATTORNEYS United States Patent Office 2,857,835
Patented Oct. 28, 1958

2,857,835
SOIL FRACTURING POINT WING SHANK AND HOLDER

Heiman P. Fitzgerald, Cimarron, N. Mex.

Application May 4, 1955, Serial No. 505,861

2 Claims. (Cl. 97—215)

This invention relates to diggers used for breaking up or fracturing soil for permitting greater infiltration of run off moisture and preventing erosion, and in particular, a shank having a tongue and slot on the extended end for receiving a soil piercing point with wings extended from the sides of the shank and with the shank adapted to be bolted to holders adapted to be welded to the surface of a drum.

The purpose of this invention is to provide a mounting for soil piercing points carried by a rotary drum whereby the points break the crust of the soil and wings on sides of mounting elements tear relatively wide openings in the soil.

Various types of digging elements have been mounted on surfaces of drums particularly for cultivating the soil, however, the mounting elements are of comparatively light weight and do not support piercing points and soil breaking portions of the devices with sufficient rigidity to withstand the abuse to which devices of this type are subjected. With this thought in mind, this invention contemplates a shank having wings on the sides and secured by a holder to the surface of a drum whereby the shank extends forwardly and, consequently, is positioned to counteract the shock loads resulting from a point carried by the outer end striking a rock or relatively hard soil.

The object of this invention is, therefore, to form a mounting shank for a soil piercing point whereby the shank is of rugged construction and wherein both the point and shank are urged forwardly into the soil as a drum upon which the parts are mounted rotates.

Another object of the invention is to provide an improved mounting shank with holding means on the end of the shank for soil piercing points wherein both the points and shanks are readily removable and replaceable.

Another important object of the invention is to provide an improved mounting shank for soil piercing points wherein the shank, which is of rugged construction, is adapted to receive a conventional point.

A further object of the invention is to provide an improved mounting shank for soil piercing points in which the shank and mounting elements thereof are of simple and economical construction.

With these and other objects and advantages in view, the invention embodies an elongated rectangular shaped holder having an arcuate under surface adapted to be secured, such as by welding, to the surface of a drum and a V-shaped shank having extended triangular shaped wings on the sides and a tongue and groove at the extended end carried by a base adapted to be secured by bolts in the holder, the base also having an arcuate under surface and adapted to be positioned on a drum.

Other features and advantages of the invention will appear from the following description, taken in connection with the drawing, wherein:

Figure 1 is a perspective view illustrating the use of the soil fracturing point shanks showing the shanks, points and holders therefor positioned on the surface of a drum rotatably mounted in a frame carried by wheels.

Figure 2 is a similar perspective view showing one of the mounting elements with the parts shown on an enlarged scale and with parts of the drum broken away.

Figure 3 is a plan view showing a shank and a holder therefor, the parts being shown on an enlarged scale.

Figure 4 is a longitudinal section through the holder taken on line 4—4 of Figure 3 with the shank, which is shown in elevation, positioned in the holder and with a point, which is shown in broken lines, extended from the end of the shank.

Figure 5 is a cross section through the shank and holder taken on line 5—5 of Figure 4.

Figure 6 is a similar cross section through the shank and holder taken on line 6—6 of Figure 4.

Figure 7 is a view showing the tip of the shank with parts broken away and parts shown in section.

Figure 8 is a longitudinal section through the holder, the shank and point being omitted.

Referring now to the drawing, wherein like reference characters denote corresponding parts, the improved soil fracturing point mounting of this invention includes a substantially V-shaped web 10 having triangular shaped wings 11 and 12 extended from side surfaces thereof, an arcuate tip 13 with a slot 14 extended inwardly from the end providing a tongue 15 and a base 16 adapted to be secured in a holder 17 with bolts 18 and 19.

The holder 17 is in the form of an elongated rectangular shaped frame having side walls 20 and 21 and end walls 22 and 23 and, as shown in Figure 8, upper edges of the end walls are provided with recesses 24 and 25 that are positioned to receive tongues 26 and 27, respectively, extended from the base 16 of the web or shank 10. The side walls of the holder are provided with bolt holes or openings 28 and 29 that are positioned to receive the bolts 18 and 19 and the under surfaces of the walls are formed on a radius corresponding with the radius of a drum upon which the holder is positioned thereby providing an arcuate under surface, as indicated by the numeral 30.

The base 16 of the shank 10 is also provided with an arcuate under surface, as indicated by the numeral 31, which is formed on a radius corresponding to the radius of a drum upon which the shank is adapted to be positioned and with the parts formed as shown and described the base 16 of the shank 10 is adapted to nest in the opening between the side and end walls of the holder as shown in Figures 4, 5 and 6. The bolts 18 and 19 extend through the openings 28 and 29 of the walls of the holder and also through registering openings, as indicated by the numerals 32 and 33, in the base 16 whereby with the bolts retained in position with nuts 34 on the threaded ends thereof the shank 10 is rigidly secured in the holder.

The holders are adapted to be secured, such as by welding, to the surface of the drum, as shown at the point 35 in Figure 2, and with the shanks bolted to the holders both the holders and shanks are rigidly mounted on the drum, which is indicated by the numeral 36.

The soil piercing points, as indicated by the numeral 37, being conventional, are provided with slots to receive the tongues 15 and by this means the points are frictionally held on the ends of the shank, as illustrated in Figures 2 and 4. The shanks are provided with shoulders 38 which, in combination with inner ends 39 of the slots 14, provide stops for the points. By this means the points are secured in position on the ends of the shanks.

With the parts designed and assembled as shown and described, the shanks 10 are secured by bolts, such as the bolts 18 and 19, in holders or frames 17 secured, such as by welding, to the surface of a drum and upon rotation of the drum the points 37 pierce the soil thereby providing openings for the shanks and the wings 11 and 12 of the shanks enlarge the openings.

Upon drawing the drum over the soil, the soil is thoroughly broken or fractured permitting greater infiltration of moisture that usually runs off and, consequently, erosion is substantially prevented.

It will be understood that modifications, within the scope of the appended claims, may be made in the design and arrangement of the parts without departing from the spirit of the invention.

What is claimed is:

1. In a soil fracturing implement, the combination which comprises a drum, substantially rectangular-shaped frames having side and end walls positioned on the surface of the drum with radially disposed openings extended therethrough and with recesses in upper inner edges of the end walls, each of said frames providing mounting means for a longitudinally disposed base positioned in the opening through the frame, said base having projections positioned in the recesses in the inner surfaces of the end walls, a web, V-shaped in elevation and having wings extended from sides thereof integral with and extended from the base, said web having point mounting means in the extended end, and bolts extended through the base and side walls of the frame and spaced inwardly from the ends of the base and frame for removably securing the base and web extended therefrom in position upon the outer surface of the drum.

2. In a soil fracturing implement, the combination which comprises a drum, substantially rectangular-shaped frames having side and end walls positioned on the surface of the drum with radially disposed openings extended therethrough, the inner surfaces of the end walls having recesses in upper edges thereof, a longitudinally disposed base positioned in the opening through each of the rectangular-shaped frames, said bases having projections at the ends and positioned with the projections in the recesses in the inner surfaces of the end walls, webs, V-shaped in side elevation and having wings extended from sides thereof integral with and extended from the bases, said webs having point mounting tongues and point receiving slots in the extended ends, bolts extended through the side walls of the frames and bases and spaced inwardly from ends of the bases and frames for removably securing the bases in the frames and with the webs extended therefrom, and piercing points carried by extended ends of the webs, the piercing points being provided with slots for receiving tongues of the webs and having tongues positioned in slots of the webs.

References Cited in the file of this patent

UNITED STATES PATENTS

| | | |
|---|---|---|
| 571,130 | Darling | Nov. 10, 1896 |
| 1,057,472 | Wiley | Apr. 1, 1913 |
| 1,225,423 | Fonnesbeck | May 8, 1917 |
| 2,663,131 | Johnson | Dec. 22, 1953 |
| 2,708,866 | Shonts | May 24, 1955 |